Aug. 12, 1958 G. V. B. HALL 2,846,850
CONTROL VALVE
Filed July 2, 1956
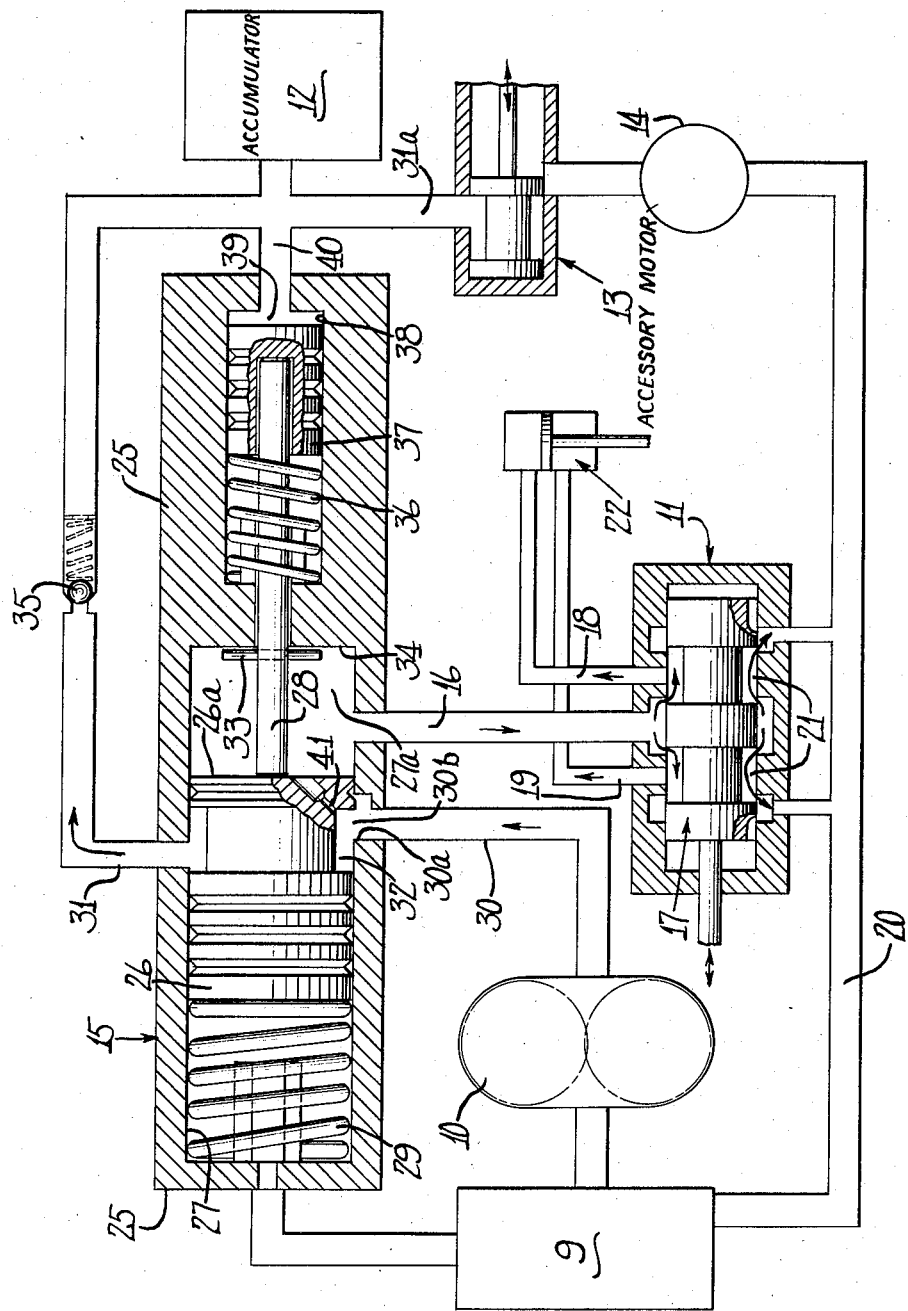
Inventor
George V. B. Hall

United States Patent Office 2,846,850
Patented Aug. 12, 1958

2,846,850

CONTROL VALVE

George V. B. Hall, Euclid, Ohio, assignor to Thompson Products, Inc., Cleveland, Ohio, a corporation of Ohio Application July 2, 1956, Serial No. 595,506

5 Claims. (Cl. 60—97)

The present invention relates to hydraulic control and actuation systems and it is, more particularly, concerned with the provisions of a simplified automatic control system for a plurality of hydraulic motors adapted for actuation by a single hydraulic pump.

Recent developments in the field of multiple hydraulic motor operation, and especially in the automotive field wherein a plurality of power accessories are to be employed on a vehicle, have shown the desirability of utilizing a single hydraulic pump for the operation of all of the hydraulic accessory motors. In such an arrangement it is desired that the single hydraulic pump be controlled to provide a continuous flow of hydraulic fluid to an open-center type of power steering control valve, as in conventional prior art power steering systems. In addition, where a central power source is to be utilized for all accessories, provision must be made for charging an accumulator and for actuating other accessories such as window lifts, seat adjustors and the like ordinarily controlled through closed-center valves. I am aware of the fact that control valve systems have been capable of accomplishing the function of supplying these seemingly incompatible systems. While these prior systems are satisfactory in the sense that they provide the necessary controls, they are not completely satisfactory for use in less expensive automotive vehicles since they utilize relatively complex hydraulic valve components. The present invention provides a substantially improved system wherein a single control valve provides automatic distribution of hydraulic fluid from the single pump to a plurality of dissimilar controlled hydraulic power accessories. This single valve not only permits satisfactory charging of an accumulator necessary for the operation of secondary accessories such as window lifts and seat adjustors, but also satisfactorily provides a continuous flow of fluid suitable for the operation of an open-center hydraulic power steering system and, further, provides complete override control providing dominance of the power steering in the system.

In accordance with the present invention a control valve housing is provided with a main chamber in which a valve core is movable. Hydraulic fluid under pressure is delivered to the chamber from the main pump and is delivered from the chamber to an open-center power steering valve by one conduit and to a hydraulic accumulator and secondary power accessories via another conduit. The pressure in the open-center power steering valve, which pressure increases when steering operation is undertaken, is referenced against the core member in opposition to a normal biasing force attending to maintain the core member in position to connect the pump conduit to the conduit leading to the accumulator. Further, the pressure in the accumulator and secondary accessory system is likewise referenced against the core member against the above-mentioned biasing force. A restricted fluid flow passage is provided between the pump and the open-center control valve of the power steering system and provides a limited fluid flow. This continuous flow is too small to prevent pressure build up in the accumulator system but it is sufficiently great to provide a rapid pressure build up in the power steering control valve conduit upon steering operation. Accordingly, upon steering operation a pressure build up occurs forcing the valve core member to move against the normal biasing force cutting off fluid flow from the pump to the accumulator system and directing all fluid from the pump to the open-center power steering control valve, by-passing the restricted orifice and providing unimpeded flow to the steering control valve. Further, in view of the referencing of the accumulator pressure against the valve core, a build up pressure in the accumulator to a predetermined maximum or fully-charged value will cause movement of the control valve to a position blocking the flow from the pump to the accumulator and permitting the entire flow from pump to pass to the open-center control valve of the power steering. Since the power steering valve is in an open position when the power steering is not in operation the fluid thus flowing to the power steering control valve will pass therethrough to the low pressure reservoir of the system.

The operational characteristics above described are all accomplished simply and within a single automatic valve occupying little space and having a minimum of moving parts. Further, the valve requires no extremely close tolerances and may be manufactured inexpensively. Additionally, the control functions are satisfactorily performed by the instant system with a minimum of hydraulic conduits, thereby minimizing the difficulty and cost of assembly.

It is, accordingly, an object of the present invention to provide a simple, yet completely automatic control system for the distribution of hydraulic power from a single central source to a plurality of hydraulic actuators.

A further object of the present invention is to provide a central control for distributing fluid under pressure from a single pump to a plurality of hydraulic motor control valves at least one of which is in an open, non-pressurized, condition when the motor is not at operation.

Still another object of the present invention is to provide an inexpensive central hydraulic power distribution valve providing complete dominance for one of the controlled power motors.

Still another object of the invention is to provide a simplified control valve for supplying hydraulic fluid under pressure to an open-center power steering valve and a closed center accessory valve while giving complete dominance to the open-center power steering valve whenever power steering demands are made upon it, and at all other times supplying fluid under pressure to the closed center valve.

A feature of the invention resides in the utilization of a single distribution control valve having a movable control member therein capable of selective blocking of a plurality of control conduits and responsive to the pressure existing in the respective control conduits to control the selective blocking action.

Another feature of the invention resides in the provision of a single control and distribution valve for supplying hydraulic fluid from a single central source to a plurality of hydraulic motors and wherein the single distribution valve is inexpensive and requires no accurately machined concentric bores or other similar difficult manufacturing steps.

Still other and further objects and features of the present invention will at once become apparent to those skilled in the art from the consideration of the attached drawing wherein the figure shows, by way of illustration only, a preferred embodiment of the present invention.

As may be seen from a consideration of the drawing, a pump 10 is constructed to supply a power steering open center control valve 11, an accumulator 12 and an accessory control valve 13 by means of a control and distribution valve generally indicated at 15. As diagrammatically shown, the power steering control valve 11 is of the conventional open-center type wherein fluid under pressure enters via conduit 16 and, depending upon the position of the valve core 17 is directed to motor conduits 18 or 19 and the reservoir conduit 20. In the position shown, the valve core 17 is in the neutral position in which no steering action takes place and wherein fluid flow is directed from the conduit 16 to the reservoir conduit 20 along the flow paths generally indicated at 21. Upon reciprocation of the valve core to the left, for example, the conduit 16 will be blocked off from the conduit 19, the conduit 16 will be fully connected to the conduit 18 and the conduit 18 will be blocked off from the reservoir 20 thereby applying the pressure in conduit 16 to the conduit 18 and actuating the power steering motor 22 downwardly. Movement of the spool 17 to the right will reverse the operation by pressurizing conduit 19 and exhausting conduit 18 to the reservoir. Under such circumstances it will be apparent that the conduit 16 is pressurized only when the power steering motor is pressurized and at all other times fluid will be released from the conduit 16 directly to the reservoir by a conduit 20 at substantially no pressure.

As those skilled in the art will recognize, the complete output of the pump 10 may be dissipated through the control valve 11, when it is in its neutral condition, without raising the pressure of the pump output to a significant extent. Accordingly, under such circumstances means must be provided to prevent such dissipation in order to utilize the pump 10 for the operation of additional accessories and for charging an accumulator, when the power steering valve 11 is in its neutral, open condition.

The automatic control is simply provided by the distribution control valve 15. In the form illustrated, this valve comprises a housing 25 having a movable core member 26 reciprocably mounted within bore 27. The core 26 is biased against stop pin 28 by means of spring 29 and when in position against the stop connects conduit 30 from the pump 10 to conduit 31 by means of an annular groove 32. The stop pin 28 is likewise reciprocably mounted but is maintained against movement in the right hand direction by means of a transverse stop pin 33 which cooperates with the end 34 of the bore 27.

The conduit 31 directs hydraulic fluid from the pressure conduit 30 to the accumulator 12 by a one way check valve 35. As it may be seen, the accessory control valve 13 is likewise connected to the conduit 31 so that it may be supplied with fluid under pressure from the accumulator 12 or from the conduit 31 directly. Pressure in the accumulator is prevented from dissipation back through the system when the pump 10 is not operating by the check valve 35. The control valve 13 is of the closed center type such that when the accessory motor 14 is not in operation the valve 13 is in its left hand position as shown in the figure and fluid under pressure is retained in the conduit 31a without dissipation through the accessory motor. It will of course be understood that a plurality of accessory motors may be connected in parallel without effecting the operation of the system.

The stop pin 28 is reciprocable toward the left against the core member 26 against the bias of spring 36 and spring 29. The stop pin 28 carries piston 37 reciprocably mounted within bore 38 which provides chamber 39 supplied with pressure from the conduit 31 via conduit 40. Accordingly, upon a buildup of pressure in the chamber 39, which pressure is equal to the pressure in the accumulator 12, to a predetermined maximum or fully charged pressure above which it is desired that the accumulator not operate, the piston 37 will move to the left carrying the core member 26 into a left hand position in which the core land 26a overlaps the corner 30a of the supply conduit port 30b, at which point no further fluid flow into the conduit 31 is possible due to the axial misalignment of the pressure inlet port 30b and the outlet 31. With the parts in this position all fluid will flow from the supply conduit 30 directly into the control valve conduit 16, through the open center control valve 11 and to the reservoir 9 via reservoir conduit 20.

When the pressure drops in the accumulator 12, from use of accessories 14, to a predetermined pressure slightly less than the maximum charging pressure, the springs 29 and 36 will overpower the piston 37 and move the land 26a to the right to permit further charging of the accumulator. The accumulator will, accordingly, be charged at a pressure between the predetermined maximum and slightly lower minimum pressures at all times when the pump 10 is operating and the power steering is not in operation.

Fluid under pressure is supplied to the power steering control valve 11 by a conduit 16 and continuously through restricted orifice 41 which for simplicity's sake may be a simple drill hole in the core member 26. This restriction permits a small flow of fluid to the control valve 11 at all times but the amount of flow compared to the total output of the pump 10 is small so that the maximum accumulator pressure may be built up in the conduit 31 when the core member 26 is in its right hand position. With this arrangement movement of the steering valve core 17 in either direction away from neutral will block off the flow of fluid through conduit 16 to exhaust and the fluid entering the chamber 27a of the bore 27 via restricted orifice 41 will immediately build up a pressure sufficient to move the core member 26 to the left against spring 29 uncovering the supply port 30b and simultaneously blocking off conduit 31. As a result, as soon as power steering is initiated all of the fluid from the pump 10 is made available for power steering purposes and further charging of the accumulator 12 is delayed until discontinuance of the steering operation. During this inert period, operation of the accessories 14 must be accomplished by the pressure previously accumulated in the accumulator 12. If the accumulator 12 is fully charged such accessories may be used many times without fail. If, however, the accumulator is uncharged when the steering operation takes place the operation of the secondary accessories such as the fluid motor 14 will be delayed until steering motion has stopped.

It will thus be seen that the control and distribution valve 15 effectively distributes hydraulic fluid under pressure to accumulator 12 and secondary accessories 14 without in any way deleteriously effecting operation of the vehicle steering. When vehicle steering is occurring, further pressurization of the accumulator and secondary accessories is discontinued. As a result, the pump 10 may be constructed to have sufficient capacity to handle the power steering system, requiring approximately 800 pounds per square inch pressure. This pressure and the capacity required of the pump 10 are more than sufficient for charging the accumulator 12 and as a result the single pump 10 satisfactorily handles all of the power accessories of the vehicle.

It will be apparent that variations may be made in accordance with the concepts of the present invention. For example, the orifice 41 may be drilled through the housing 25 of the valve 15 between conduits 30 and 16. The position shown in the core member 26 is utilized in the preferred embodiment, however, since it is an extremely simple manufacturing step when the core member 26 is being constructed. It will be noted that expense is further minimized in the construction of the valve 15 by constructing the core member 26 and the stop pin 28 separately. This eliminates any necessity for maintaining the bores 38 and 27 absolutely coaxial, a feat which is quite expensive in actual production.

Since further variations and modifications may be made in accordance with the principles of the present invention without departing from the novel concepts thereof it is understood that the scope of the present invention is intended to be limited solely by the scope of the hereinafter appended claims.

I claim as my invention:

1. In combination in a centralized power system for a plurality of fluid motors supplied by a single fluid pump wherein one of said motors is controlled by an open-center valve normally by-passing fluid to a low pressure reservoir when said one motor is inactive and wherein at least one other of the motors is controlled through a closed-center valve, a single distributing and control valve comprising a housing, a core member in said housing and moved in a chamber therein into a first position by a biasing means, a supply port in said housing introducing fluid from said pump to said chamber, a first exit port connecting said chamber to said one motor via said open center valve, a second exit port connecting said chamber to said other motor via said closed center valve, a restricted orifice continuously connecting said supply port and said first exit port and extending through said member, a port extending through said member and connecting said supply port and said second exit port when said member is in said first position, means referencing the pressure in said first exit port against said member to move said member into a second position in which said supply port and first exit port are directly connected and said second exit port is substantially closed off from said supply whereby actuating of said open-center valve will cause a pressure build up against said member to by-pass said restricted orifice and supply said one motor with fluid under pressure to the exclusion of said other motor.

2. In combination in a centralized power system for a plurality of fluid motors supplied by a single fluid pump wherein one of said motors is controlled by an open-center valve normally by-passing fluid to a lower pressure reservoir when said one motor is inactive and wherein at least one other of the motors is controlled through a closed-center valve normally maintained under pressure when said other motor is inactive, a single distributing and control valve comprising a housing, a core member in said housing and moved in a chamber therein into a first position by a biasing means, a supply port in said housing introducing fluid from said pump to said chamber, a first exit port connecting said chamber to said one motor via said open center valve, a second exit port in said housing and out of alignment with said exit port and said supply port for connecting said chamber to said other motor via said closed center valve, a restricted orifice connecting said supply port and said first exit port, a port in said member and overlapping said supply port and said second exit port when said member is in said first position, means referencing the pressure in said first port against said member to move said member into a second position in which said supply port and first exit port are directly connected and said second exit port is no longer in overlapping relation with said supply port whereby actuation of said open center valve will cause a pressure build up against said member to directly connect said supply port and said first exit port to supply said one motor with fluid under pressure to the exclusion of said other motor, and means referencing the pressure in said other motor control valve against said member to move said member against said spring to close said second exit port after a predetermined maximum pressure is built up in said closed-center control valve.

3. In combination in a centralized power system for a plurality of fluid motors supplied by a single fluid pump wherein one of said motors is controlled by an open-center valve normally by-passing fluid to a low pressure reservoir when said one motor is inactive and wherein at least one other of the motors is controlled through a closed-center valve normally maintained under pressure when said other motor is inactive, a single distributing and control valve comprising a housing, a core member in said housing and moved in a chamber therein into a first position by a biasing means, a supply port in said housing introducing fluid from said pump to said chamber, a first exit port connecting said chamber to said one motor via said open center valve, a second exit port in said housing and out of alignment with said exit port and said supply port for connecting said chamber to said other motor via said closed center valve, a restricted orifice connecting said supply port and said first exit port, a port in said member and overlapping said supply port and said second exit port when said member is in said first position, means referencing the pressure in said first port against said member to move said member into a second position in which said supply port and first exit port are directly connected and said second exit port is no longer in overlapping relation with said supply port whereby actuation of said open center valve will cause a pressure build up against said member to directly connect said supply port and said first exit port to supply said one motor with fluid under pressure to the exclusion of said other motor, an accumulator connected in parallel with said other motor and connected to said second exit port, a check valve in said second exit port preventing fluid flow from said accumulator back into said chamber, and means referencing the pressure in said accumulator against said member to move said member against said spring to close said second exit port after a predetermined maximum pressure is built up in said accumulator.

4. In combination in a centralized power system for a plurality of fluid motors supplied by a single fluid pump wherein one of said motors, is controlled by an open-center valve normally by-passing the fluid to a low pressure reservoir when said one motor is inactive and wherein at least one other of the motors is controlled through a closed-center valve normally maintained under pressure when said other motor is inactive, a single distributing and control valve comprising a housing, a bore in said housing, a core member reciprocably mounted in said bore and defining a chamber at one end thereof, spring means biasing said core into a first position contracting said chamber, a supply port in said housing introducing fluid from said pump to said chamber, an exit port connecting said chamber to said one motor via said open-center valve, a second exit port connecting said chamber to said other motor via said closed-center valve, a restricted orifice connecting said supply port and said first exit port, a port in said member connecting said supply port in said second exit port when said member is in said first position, whereby pressure build up in said chamber as a result of actuating of said one motor and closure of said open-center valve will move said core against said spring to block off the port between said supply port and said second exit port and open a direct unrestricted passage from said supply port to said first exit port, and means referencing the pressure in the closed-center control valve against said core and against said spring to move said core to block off said port between said supply port and said second exit port after a predetermined maximum pressure is built up in said closed-center control valve.

5. In combination in a centralized power system for a plurality of fluid motors supplied by a single fluid pump wherein one of said motors, is controlled by an open-center valve normally by-passing the fluid to a low pressure reservoir when said one motor is inactive and wherein at least one other of the motors is controlled through a closed-center valve normally maintained under pressure when said other motor is inactive, a single distributing and control valve comprising a housing, a bore in said housing, a core member reciprocably mounted in said bore and defining a chamber at one end thereof, spring means biasing said core into a first position contracting said chamber, a supply port in said housing introducing fluid from said pump to said chamber, an exit port connecting said chamber to said one motor via said open-center valve, a second exit port connecting said chamber to said other motor via said closed-center valve, a restricted orifice connecting said supply port and said first exit port, a port in said member connecting said supply port in said second exit port when said member is in said first position, whereby pressure build up in said chamber as a result of actuating of said one motor and closure of said open-center valve will move said core against said spring to block off the port between said supply port and said second exit port and open a direct unrestricted passage from said supply port to said first exit port, an accumulator connected in parallel with said closed-center control valve and connected to said second exit port, and means referencing the pressure in said accumulator against said core to move said core against said spring to block off said port in said member thereby disconnecting said second exit port from said supply port after a predetermined maximum pressure is built up in said accumulator.

References Cited in the file of this patent

UNITED STATES PATENTS

| | | |
|---|---|---|
| 2,363,179 | Harrington et al. | Nov. 21, 1954 |
| 2,674,092 | Gardiner | Apr. 6, 1954 |
| 2,737,196 | Eames | Mar. 6, 1956 |